US009558147B2

United States Patent
Concer et al.

(10) Patent No.: US 9,558,147 B2
(45) Date of Patent: Jan. 31, 2017

(54) FINE-GRAINED STREAM-POLICING MECHANISM FOR AUTOMOTIVE ETHERNET SWITCHES

(71) Applicant: NXP B.V., Eindhoven (NL)

(72) Inventors: Nicola Concer, Eindhoven (NL); Sujan Pandey, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 229 days.

(21) Appl. No.: 14/303,137

(22) Filed: Jun. 12, 2014

(65) Prior Publication Data

US 2015/0363355 A1    Dec. 17, 2015

(51) Int. Cl.
| | |
|---|---|
| *H04L 12/28* | (2006.01) |
| *G06F 15/167* | (2006.01) |
| *H04L 12/861* | (2013.01) |
| *H04L 12/931* | (2013.01) |
| *H04L 12/851* | (2013.01) |

(52) U.S. Cl.
CPC ............ *G06F 15/167* (2013.01); *H04L 49/90* (2013.01); *H04L 47/2441* (2013.01); *H04L 49/351* (2013.01)

(58) Field of Classification Search
CPC .. H04L 43/0876; H04L 47/50; H04L 47/2441; H04L 49/351; H04L 49/90; G06F 15/167
See application file for complete search history.

(56) References Cited

U.S. PATENT DOCUMENTS

| | | | |
|---|---|---|---|
| 6,304,948 B1 * | 10/2001 | Motoyama | G06F 21/80 711/144 |
| 6,396,843 B1 | 5/2002 | Chiussi et al. | |
| 6,580,721 B1 * | 6/2003 | Beshai | H04L 12/5693 370/395.2 |
| 8,213,454 B2 * | 7/2012 | Insler | H04L 47/10 370/237 |
| 2002/0001305 A1 * | 1/2002 | Hughes | H04Q 11/06 370/369 |
| 2004/0015923 A1 * | 1/2004 | Hemsing | G06F 9/44557 717/154 |

(Continued)

FOREIGN PATENT DOCUMENTS

EP    0 989 770 A1    3/2000

OTHER PUBLICATIONS

Extended European Search Report for EP Patent Appln. No. 15171284.1 (Oct. 7, 2015).

(Continued)

*Primary Examiner* — Abdelnabi O Musa
(74) *Attorney, Agent, or Firm* — Rajeev Madnawat

(57) ABSTRACT

A system and method for monitoring a plurality of data streams is disclosed. At a first processing stage, a first memory area is associated to an element of a plurality of data streams. Upon arrival of a frame associated with one of the plurality of data streams, a second memory area is associated to the arrived frame based on the element. In the second memory area, a data indicating an arrival of the arrived frame is recorded and on a successful recording, the frame is forwarded to a second processing stage. An independent process executes at a preselected time interval to erase contents of the first memory area.

17 Claims, 6 Drawing Sheets

(56) References Cited

U.S. PATENT DOCUMENTS

| | | | | |
|---|---|---|---|---|
| 2004/0160960 | A1* | 8/2004 | Monta | H04N 21/23406 370/395.4 |
| 2009/0303883 | A1* | 12/2009 | Kucharczyk | H04L 12/4645 370/241 |
| 2014/0244578 | A1* | 8/2014 | Winkelstraeter | G06F 11/1435 707/617 |

OTHER PUBLICATIONS

The MEF, "Technical Specification, MEF 10.2 Ethernet Services Attributes Phase 2", 65 pgs. (Oct. 27, 2009).

* cited by examiner

FINE-GRAINED STREAM-POLICING MECHANISM FOR AUTOMOTIVE ETHERNET SWITCHES

BACKGROUND

The bandwidth requirements of modern and future automotive applications are posing a relevant challenge to current in-vehicle networking (IVN) technologies such as Controller Area Network (CAN) and FlexRay™. Thanks to the latest development of the Ethernet technology, a 100 Mbps Ethernet link can now be implemented on an unshielded twisted pair of copper wires while limiting the EMI emissions below the threshold imposed by the regulatory automotive standards.

Ethernet is a point to point communication technology. More complex networks are created by using layer 2 (according to the ISO/OSI stack) bridges (also called switches). Switches enable the definition of complex network topologies and offer many services including the basic relying of frames (the basic Ethernet communication element) from one source node to multiple destinations, and more complex operations such as channel bandwidth allocation, network partitioning via virtual LANs (VLANs) and traffic prioritization. Switched Ethernet networks have been implemented in the automotive market for supporting bandwidth-intensive applications such as infotainment and surround-view applications. These applications make use of audio and video streams that are generated by a single source, also called Talker (e.g., a camera or multimedia player) and distributed to one or more Listeners (e.g., head unit or remote screens and audio amplifiers). To optimize the handling of these data streams the IEEE has defined Audio/Video Broadcasting (AVB) standards that allows switches to identify different types of traffic streams and categorize them into different traffic classes.

The IEEE standards define a collection of standards targeted to optimize the transmission of audio and video streams on an Ethernet network under the name of AVB (Audio/Video Broadcasting). The main standards relevant for this work are the following:

802.1Qat—Stream reservation protocol: is a distributed protocol that allows talkers to advertise available streams and listeners to register to a selected stream and reserve the necessary bandwidth in the relevant switches;

802.1Qav—Forwarding and Queuing Enhancements for Time-Sensitive Streams: defines a Credit Shaper hardware component capable of allocating specific amounts of bandwidth to a traffic class identified by a traffic priority;

802.1AS—Timing and Synchronization for Time-Sensitive Applications in Bridged Local Area Networks: specifies the protocol to be implemented by all end-nodes (e.g. ECUs) and switches of a network so that all the nodes of the network remain synchronized;

802.1BA—Audio Video Bridging (AVB) Systems: defines the AVB profile, in terms of configuration and features of the previous standards that all AVB systems should have.

These standards/protocols are implemented by network nodes including network switches. IEEE 802.1Q defines traffic Class A as a class whose streams generate one or more frames every 125 μs while Class B has a period of 250 us. The size of each frame depends on the specific format of the stream being transmitted.

Ethernet based networking has already been adopted by the automotive industry. The industry is now considering the adoption of Ethernet for safety-critical applications and has created the AVNU/AAA2C committee. The goal of this committee is to define a set of requirements to be adopted into a revised version of the IEEE AVB standards. The future version of AVB will be called Time-Sensitive Networks (TSN). An important element of AVB and TSN is the distributed synchronization protocol (IEEE 802.1AS) that allows all nodes of the network and the switches to share a common time reference with minimal jitter. This aspect enables lip sync reproduction of audio and video streams on different end points but also the correct fusion of data coming from different sensors such as cameras and radars.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for monitoring a plurality of data streams is disclosed. At a first processing stage, a first memory area is associated to an element of a plurality of data streams. Upon arrival of a frame associated with one of the plurality of data streams, a second memory area is associated to the arrived frame based on the element. In the second memory area, a data indicating an arrival of the arrived frame is recorded and on a successful recording, the frame is forwarded to a second processing stage. An independent process executes at a preselected time interval to erase contents of the first memory area.

In another embodiment, a network switch is disclosed. The network switch includes a processor and a memory. A first software program stored in the memory. The first software program when executed by the processor, performs an operation, the operation includes, at a first processing stage, associating a first memory area to an element of a plurality of data streams and upon detecting an arrival of a frame associated with one of the plurality of data streams, associating a second memory area to the arrived frame based on the element. The operation further includes recording in the second memory area, a data indicating an arrival of the arrived frame and on a successful recording, forwarding the frame to a second processing stage. A second software program is stored in the memory. The second software program when executed by the processor at a preselected time interval erases contents of the first memory area.

In yet another embodiment, a method for monitoring a plurality of data streams is disclosed. Accordingly, at a first processing stage, a memory area is associated to an element of a plurality of data streams. Upon arrival of a first frame associated with a first stream in the plurality of data streams, a first part of the memory area is associated to the arrived first frame based on the element. A first data indicating an arrival of the arrived first frame is recorded in the first part and on a successful recording, the first frame is forwarded to a second processing stage. Upon arrival of a second frame associated with a second stream in the plurality of data streams, a second part of the memory area is associated to the arrived second frame based on the element. A second data indicating an arrival of the arrived second frame is recorded in the second part and on a successful recording, the second frame is forwarded to the second processing stage. Further, a first independent process is associated with the first part and a second independent process is associated with the second part. The first independent process and the second independent process execute at preselected time intervals to erase contents of the first part and the second part respectively.

In some embodiments, the first frame is dropped if the recording in the first part fails. In another embodiment, an exception is raised when the recording in the first part fails. The exception may then result in marking the frame as "out-of-policy." The recording fails when all memory locations of the memory area are occupied. The element of the plurality of data streams is a selected attribute that is common to the plurality of data streams.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
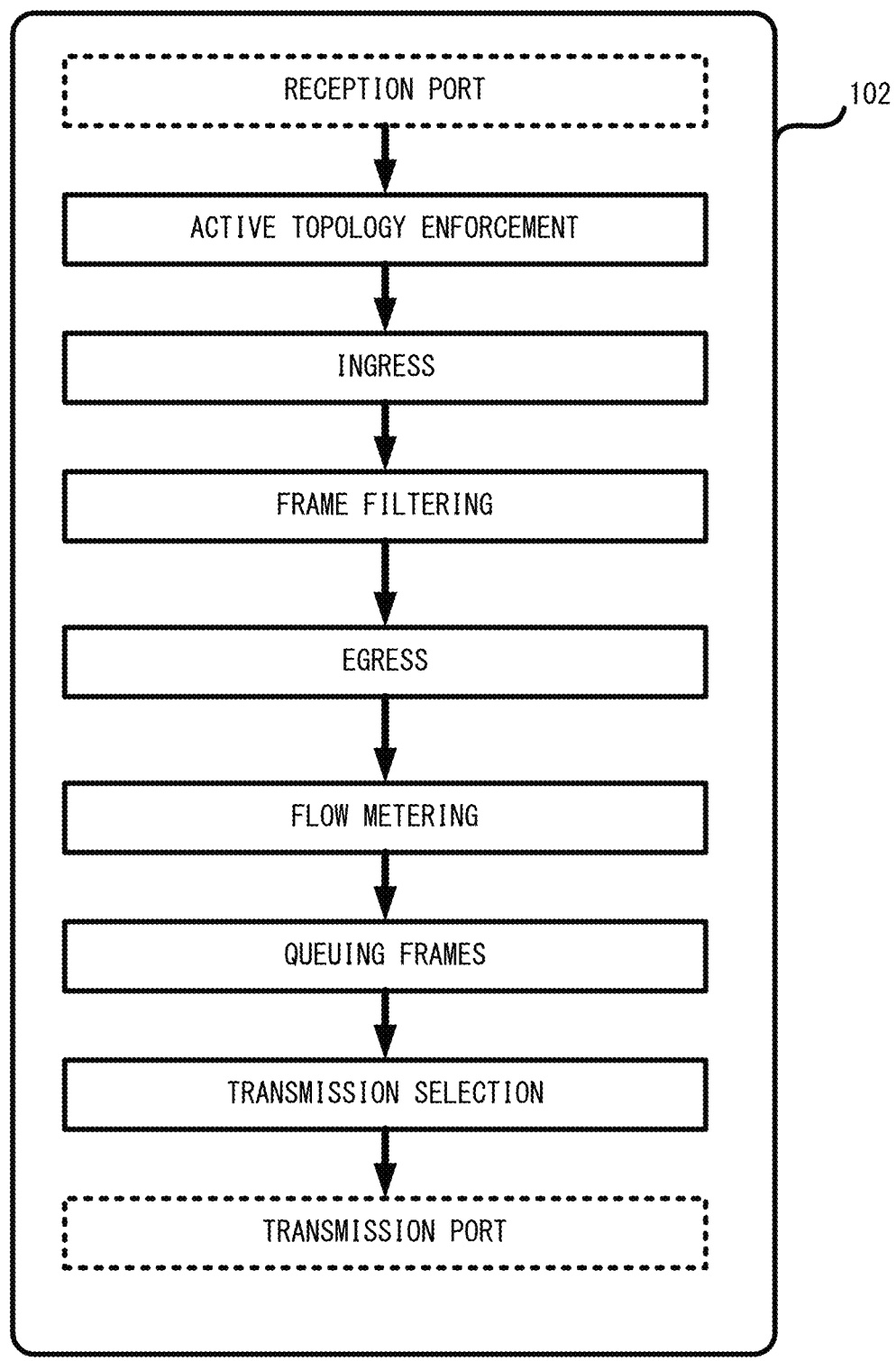
FIG. 1 is an exemplary schematic of a network switch.

FIG. 1 shows the main steps implemented by a typical Ethernet switch 102. Accordingly, after a frame is received at the reception port, the active topology enforcement is performed to check whether the input port is enabled to receive frames. If the received frame is a part of a set that can be processed and forwarded, the frame is forwarded to an ingress stage. Passed the input stage, the frame enters a frame filtering stage where output ports to receive a copy of the frame are selected. Selecting the output ports that will receive a copy of the frame is called the egress stage. Once the frames reaches an output port a flow metering stage that checks if the arrival rate of the frames is within certain thresholds defined in the switch configuration. Finally the frame is queued into one of the multiple output queues and then forwarded.

The flow metering stage is also called Input Policing. Typically, the role of input policing is to check that the frames arriving at the specific output port are within certain parameters defined by the management of the switch.

The IEEE 802.1Q standard that regulates the operation of a switch does not specify an exact implementation of the policing stage leaving to the manufacturer the choice of specific implementation and policy. The standard only suggests the adoption of the Leaky Bucket (LB) algorithm for metering the arrival rate of frames. LB uses counters to monitor a specific element "e" that can be an Ethernet stream, a VLAN, a specific traffic class (identified by the priority) or a switch input port. Typically, to implement LB a switch needs the following elements on each port and for each monitored element e:

a counter $C_e$ for each element e (e.g., input port, traffic class, VLAN, etc.) that the switch 102 can monitor;

a threshold value $T_e$ that sets the threshold limit of the related counter $C_e$; and a decrement-ratio indicator $D_e$ that indicates to the switch the amount that can be decremented from the counter $C_e$ for each unit of time.

Every time a frame associated with the tracked element e arrives, the counter $C_e$ is incremented by an amount linear to the size of the frame. If the counter passes a user-specified threshold $T_e$ the frame is marked as drop eligible (typically via a specific bit in the frame's header) and the action associated to this event is triggered. While the tracked element is idle (e.g., no frames associated to the element arrive), the counter is decremented by a certain amount $D_e$ every (pre-defined) delta-cycle. Typical switches for commercial applications track elements such as input port or priority while limiting the number of trackers to less than ten. Commercial switches then do not consider per VLAN or per-stream policies because the relative large number of possibilities and therefore the large costs in terms of complexity and implementation area and power consumption (e.g., the IEEE standard indicate that a switch can support up to 4096 VLANs).

In one example, an element (e) of the plurality of data streams can be a specific audio stream out of a number of registered audio and video streams in an Ethernet network used for entertainment (e.g., connecting the head-unit, the front speakers and the rear entertainment units). In another example, the element may be a specific control stream of an air-conditioning monitoring unit, out of the hundreds of possible sensors-to-actuators streams supported by an Ethernet in-vehicle network. In yet another example, the element can be a stream registered to carry the data collected by a front long-range radar out of the Advance Driving Assistance System (ADAS) streams that could be carried over Ethernet including radar, camera and Lidar-dedicated data streams.

The IEEE TSN working group is updating the AVB standard to support a new set of features such as (but not limited to) a time-triggered traffic scheduler, and a new traffic class specifically developed for automotive and industrial applications. In this document this new traffic class is referred to as class C. Similarly to class A and B, the traffic of class C will be periodic with fixed intervals, and the applications adopting this class will use the synchronization protocol defined in 802.1AS as shared time-reference.

Different from the previous classes though, traffic class C has configurable intervals whose period will range from 5 ms to 1000 ms. Here a large number of streams (e.g., 64) will be generated with a fixed rate. Because of the control nature of this traffic, class C frames will be relatively small with respect to audio and video streams and remain well below 512 bytes. This will enable the support for hundreds of automotive-control streams which will potentially share the same Ethernet network or even the same path.

A key point for all class C traffic is that all frames must be delivered within application-specific deadlines. Additionally no frames must be dropped during normal execution, even in the case the control traffic shares the same channels with bandwidth-intensive audio and video streams.

Figure 2:
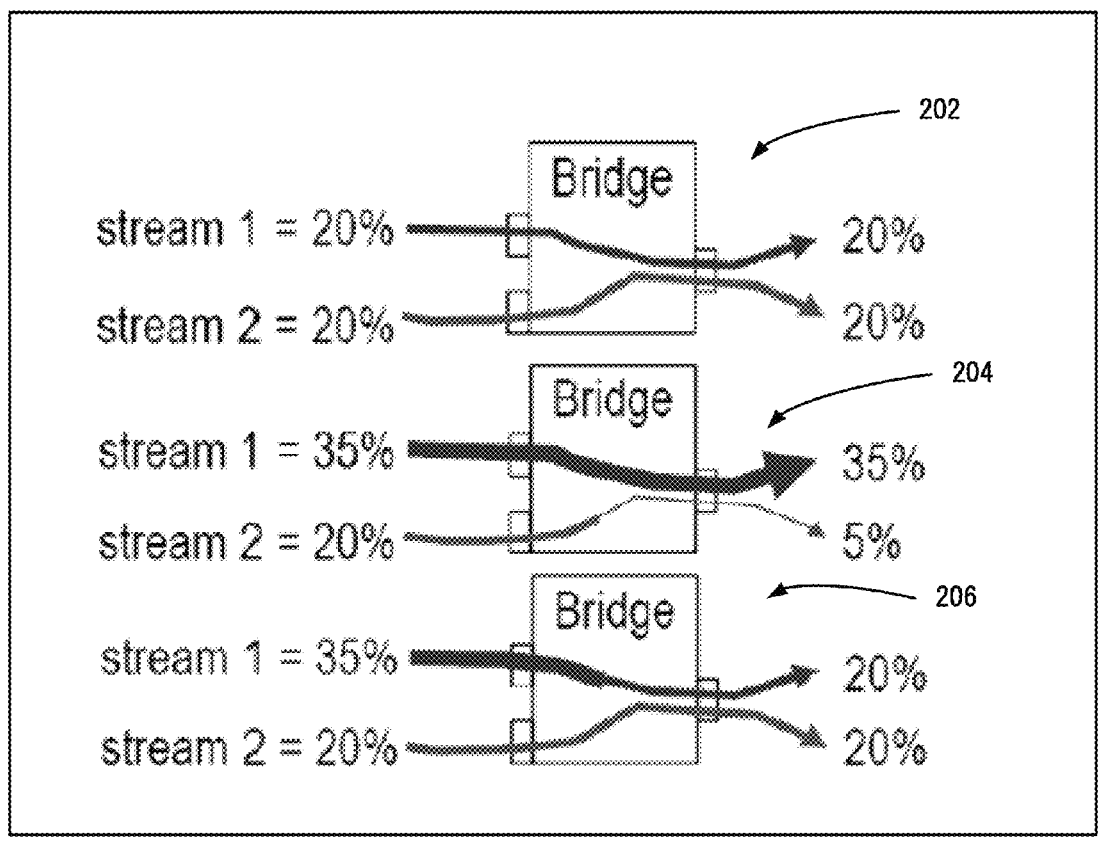
FIG. 2 illustrates an exemplary depiction of frame/traffic conflicts among streams.

FIG. 2 exemplify stream filtering. The figure shows a switch traversed by two streams: $stream_1$ and $stream_2$, each utilizing 20 Mbps (for example). The input filter is (e.g., a per-class LB filter) set to 40 Mbps and monitors the shared traffic class of the two streams. The traffic flow depiction 202 shows both streams follow a desirable behavior without exceeding the maximum allowed bandwidth metered by the filter. In the traffic flow depiction 204, the source of $stream_1$ becomes a babbling-idiot generating more traffic than expected causing an erroneous situation. This erroneous condition can be caused by a number of voluntary or accidental situations. In the scenario depicted in the traffic flow depiction 204, $stream_1$ consumes much more bandwidth than it is supposed to. Because the input filter monitors only the class of the streams it only allows through 40 Mbps of the 55 that is now receiving. If the switch is configured to drop the frames in excess (typically a default configuration) a random number of frames belonging to both streams are dropped. This is a highly undesirable outcome especially when hundreds of control streams share the same Ethernet ports. The traffic flow depiction 206 shows the result of a fine-grained per-stream filter: when $stream_1$ becomes babbling, only the frames belonging to $stream_1$ are dropped while $stream_2$ remains unaffected.

In one example, Per-stream input policing can be implemented by providing a large number of LB filters at the cost of large area and power consumption of the switch IP. For example to avoid erroneous filtering, a LB is configured to count the bits of the largest possible Ethernet frame arriving at the port and then allow some extra "space". At 100 Mbps 1500 Bytes are transmitted in about 125 μs. For tracking the bits received in a delta cycle of 200 μs a counter register Ce of 16 bits and similar Te and De registers for each tracked element is used. It should be noted that parameter values used throughout this disclosure are merely exemplary.

In one or more embodiments, the amount of logic required to monitor a large number of streams is minimized by leveraging the known characteristics of the targeted traffic and network. For example, the monitored streams have substantially constant bitrate and each stream generates a fixed number of frames per periodic interval. In addition, nodes of the network agree on a shared common time reference provided by the local implementation of a synchronization protocol.

According to one embodiment, at a first processing stage, a first memory area is associated to an element of a plurality of data streams and upon arrival of a frame associated with one of the plurality of data streams, a second memory area is associated to the arrived frame (or one stream out of the plurality of data streams) based on the element. A data indicating an arrival of the arrived frame is recorded in the second memory area and on a successful recording, the frame is forwarded to a second processing stage. An independent process executes at preselected time intervals to erase contents of the first memory area. In one example, the second memory area is a part of the first memory area as for example, the first memory area may occupy 60 bits of a 64 bit memory area and the second memory area may occupy the remaining 4 bits. When the second memory area is a part of the first memory area, the independent process erases contents of the first memory area and the second memory area.

Figure 3:
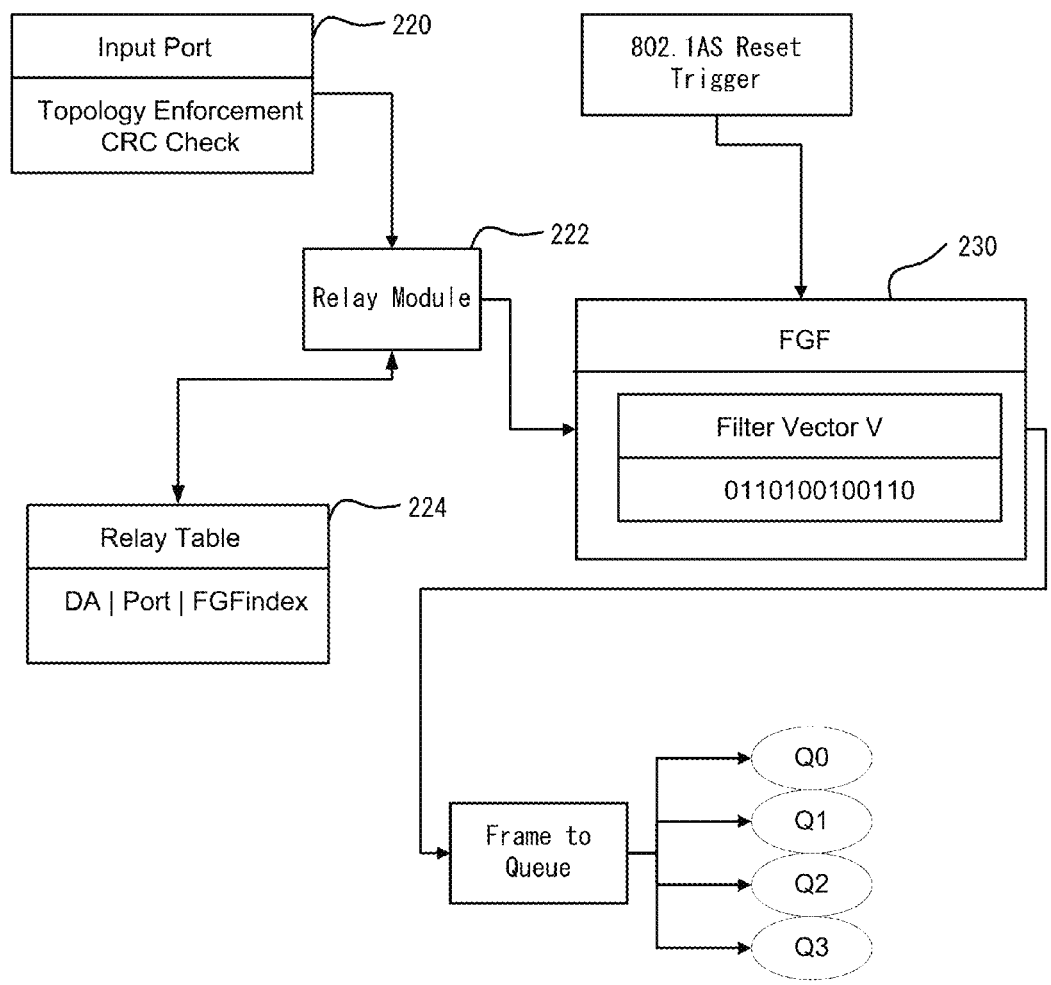
FIG. 3 illustrates a switch relay, a filter and output ports in accordance with one or more embodiments of the present disclosure.

FIG. 3 shows the operation of a Fine Grained Filter (FGF) 230. The FGF 230 minimizes the amount of storage and logic required to monitor a large number of streams by using a very small number of bits (e.g., two to three) for each counter Ce and completely remove the threshold Te and decrement register De. This is possible because the FGF 230 leverages the known characteristics of the targeted traffic and network characteristics, that is the streams are periodic with a fixed interval defined by the management, each stream generates generally one frame per periodic interval and all nodes of the network agree on a shared time reference provided by the local implementation of 802.1AS which guarantees a distributed synchronization with worst case jitter of 1 μs.

For the purpose of the description of FIG. 3, the following elements are defined:

Slot: Se a string of bits associated to an element e, e.g., a VLAN ID or a stream identified by the destination address (DA);

Slot Set $T_t$: a set of slots sharing the same period t, e.g., t=8 ms;

Filter Vector V: a bit-vector implementing one or more sets.

According to one aspect, at the arrival of a frame, the input port 220 forwards the received frame to the relay module 222. Here, using a relay table 224, the destination address and VLAN information of the frame are used to select which ports should be used to forward the received frame. The relay table 224 can be extended to add $FGF_{index}$, an index that is used to identify the right slot Se in filter vector V. Note that VLAN and DA identify in a unique way a stream and that a similar approach is used even with per stream LB filtering.

In one example, at the input policing stage, the FGF 230 locates Se and calls a SET(Se) operation that flips one 0 to 1 to indicate that a frame has been received. If no zeros are available then an exception is raised. If the frame is not dropped it is passed to the following stages of the switch to be forwarded. Finally at regular intervals defined in accordance with the traffic class C and identified via the synchronized time offered by 802.1AS, the FGF 230 triggers a RESET(Tt) operation of the set Tt. In one embodiment, this operation has the same effect of decrementing the counter but it affects all the streams (and their slots) of a set Tt at once and it does not consider specific values of the slots, that instead are all set to zero. Note that IEEE 802.1AS is the synchronization protocol used in Ethernet for automotive. The embodiments described herein can also be used with other synchronization protocols such as IEEE 1588, NTP and SAE AS6802 part 7.

The SET and RESET operations enable the tracking of a large number of streams by minimizing the information needed to track the arrival rate per unit of time. They also leverage the periodic characteristic of the control traffic which allows to use the RESET operation for a large number of streams sharing the same traffic class C. Finally the synchronized time offered by the implementation of IEEE 802.1AS guarantees that all nodes agree on a common reference time.

Multiple Slot-Sets Tt1 . . . Ttn can be used to track different stream periods. An implementation of a generic Tti can be mapped in a slot-specific register or use a portion of a large register implementing an entire bit vector V. If the intervals t1 . . . tn share a minimum common denominator the state needed to store which set must be zeroed is minimal.

A slot is the set of bit-flags that are associated to a single stream e. In some embodiments, it is assumed that all slots are of the same width, which can be configurable via the switch management registers. Slots are identified by an ID that is stored in the table of the relay module. This ID can be statically assigned or automatically generated once a stream is registered at runtime via a protocol such as IEEE 802.1Qat Stream-Reservation Protocols (SRP). SRP is a distributed reservation protocol designed to reserve the bandwidth needed to transport a new stream (e.g., audio, or video . . . ) along a path of Ethernet bridges in a Local Area Network (LAN).

The SET function on a slot can have multiple implementations: an add operation can extend the number of frames per period (e.g., with 2 bits, 3 frames are accepted) at the cost of increased complexity and flexibility. Another option is to use each bit as a flag so that with simple bit comparison operations one 0 can be turned into 1. The number of bits can be associated to a full Ethernet frame or to a specific amount of data (e.g., 128 Bytes). The complexity of the implementation grows with the number of supported options.

The RESET operation is triggered by the local synchronized clock managed by an implementation of a distributed synchronization protocol such as IEEE 802.1AS. This clock can be monitored such that every t milliseconds the clock can generate a reset signal. t is the period of the streams of class C that the switch supports. Note that the period of the Class C is configurable but once it has been defined it remains constant for the entire operation of the switch. If the switch supports multiple periods t1 . . . tn and therefore multiple slot sets then the clock-monitoring components can be configured accordingly.

Figure 4A:
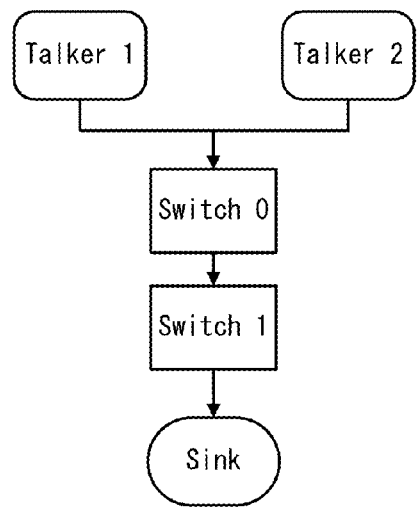
FIG. 4(a) illustrates two stream sources sending frames via same network nodes.
Figure 4B:
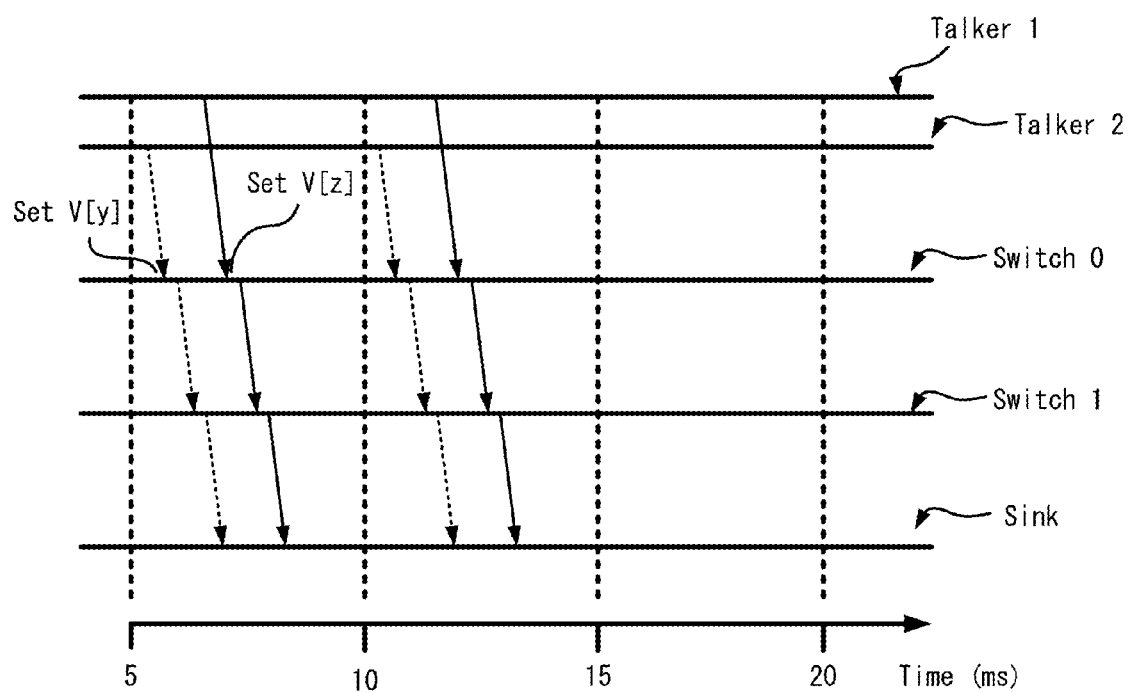
FIGS. 4(b)-4(d) illustrate temporal diagrams of frame transmissions according to various scenarios.

FIG. 4(a) shows an example of communication. Talker 1 and Talker 2 send periodic class C frames to the sink. FIG. 4(b) shows a temporal diagram of a case where both Talkers are enabled. In FIG. 4(b), the horizontal lines indicate the events happening at each node, while the dotted vertical lines indicate the reset operation with a period of t=5 ms. The dotted and solid arrows indicate the movement across the network of frames generated by Talker 1 and Talker 2 respectively. At each switch the local slots V[y] and V[z] are located by the relay module and the SET operations are invoked. Because the flows are well configured, no frames are dropped.

Figure 4C:
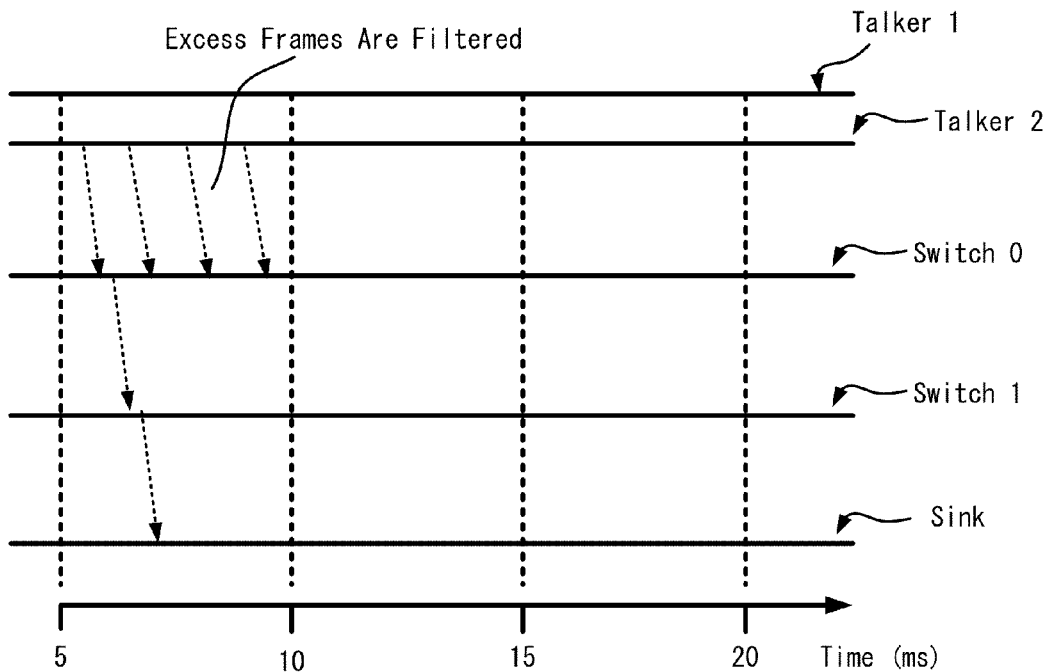

FIG. 4(c) shows a temporal diagram where only Talker 1 is enabled. Talker 1 is having a malicious behavior acting as a babbling idiot. Here FGF allows only a limited number of frames to go through (here only one but it depends on the slot configuration). In this case the following frames are dropped.

Figure 4D:
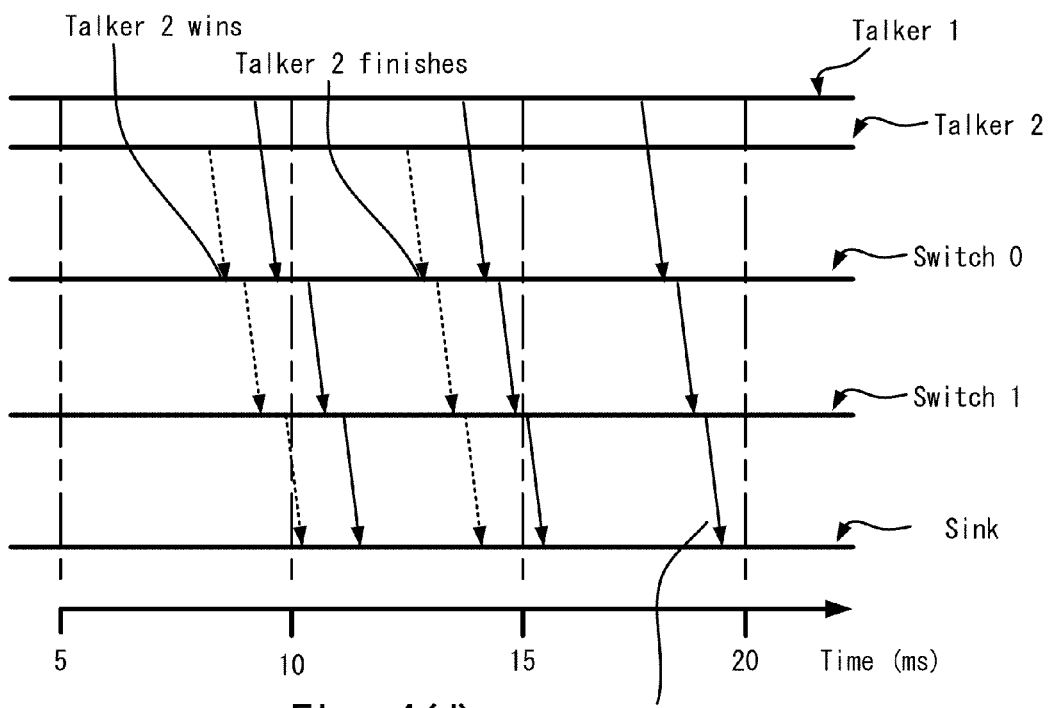

FIG. 4(d) shows the temporal diagram of a case where the frames depicted using solid arrows show some jitter due to the presence of other streams (dotted arrows). In the intervals 5-10 ms and 10-15 ms the stream depicted using solid arrows is delayed by the stream depicted using dotted arrows. In the interval 15-20 ms though the stream depicted using dotted arrows terminates so the stream depicted using solid arrows is no longer delayed. In this correct scenario two frames of the stream depicted using solid arrows are delivered in the same 15-20 m s interval. Here the second frame could potentially be dropped even if the network operation was correct. To avoid the slot-overflow and the consecutive erroneous drop of frames, the slot must be sized to consider some jitter in the frame delivery.

Figure 5:
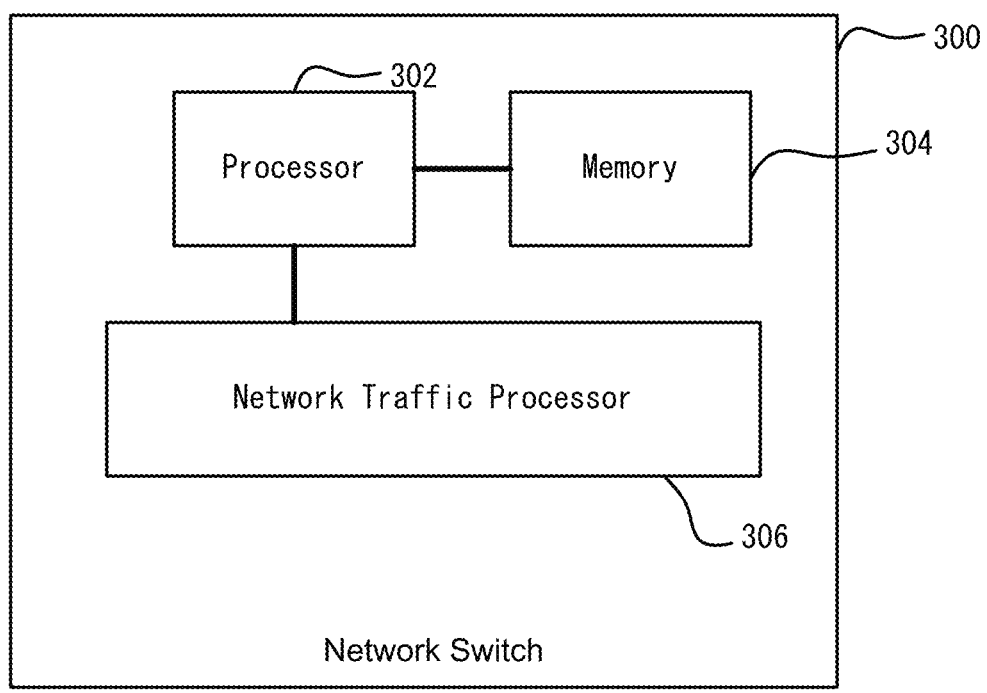
FIG. 5 is a schematic of a network switch in accordance with one or more embodiments of the present disclosure.

FIG. 5 is a schematic of a network switch 300. The network switch 300 includes a processor 302 and a memory 304. The network switch 300 further includes a network traffic processor 306 and a fine grained filter (FGF) described in this document which is configured to process incoming data frames in accordance with the embodiments described herein. The network traffic processor 306 may be implemented in hardware, software or in a combination thereof. In one example, the network traffic processor 306 provides functionality of the switch depicted in FIG. 1 according to the embodiments described herein. For example, the network traffic processor 306 is configured to perform an operation through the processor 302. The operation includes, at a first processing stage, associating a first memory area to an element of a plurality of data streams and upon arrival of a frame associated with one of the plurality of data streams, associating a second memory area to the arrived frame based on the element. The first memory area is a section of the memory 304. The operation further includes recording in the second memory area, a data indicating an arrival of the arrived frame and on a successful recording, forwarding the frame to a second processing stage. Note that the second memory area is encapsulated within the first memory area. The size of the first memory area is configured big enough to have space for a configurable number of the second memory areas so that multiple streams can be monitored simultaneously. The memory 304 includes an independent process that is executed by the processor 302 at a preselected time interval to erase contents of the first memory area. In another embodiment, there may be more than one preselected time intervals. Time intervals may be configured by a user or network administrator. In one example, writing to the memory 304 (such as the memory association when a frame arrives) is done only by the network traffic processor 306 whereas the memory 304 may be periodically reset either by the processor 302 or the network traffic processor 306. In another embodiment, there are a plurality of independent processes configured to execute at different user selectable time intervals. Each of these plurality of independent processes are configured to reset different memory locations in the first memory area. For example, if the first memory area is 64 bit long, a first independent process may be configured to erase the first 16 bits and a second independent may be configured to erase the next 16 bits and so on.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for monitoring a plurality of data streams, comprising:
    at a first processing stage, associating a first memory area to an element of a plurality of data streams;
    upon arrival of a frame associated with one of the plurality of data streams, associating a second memory area to the arrived frame based on the element;
    recording, in the second memory area, a data indicating an arrival of the arrived frame; and
    on a successful recording, forwarding the arrived frame to a second processing stage, wherein an independent process executes, at a preselected time interval, to erase contents of the first memory area that correspond to the preselected time interval.

2. The method of claim 1, wherein the second memory area is a part of the first memory area.

3. The method of claim 1, wherein the first memory area is bigger than the second memory area.

4. The method of claim 1, wherein the independent process erases contents of the first memory area and the second memory area.

5. The method of claim 1, wherein the element of the plurality of data streams is a selected attribute that is common to the plurality of data streams.

6. The method of claim 1, wherein the preselected time interval is configurable by a user.

7. A network switch, comprising:
    a processor,
    a memory;
    a first software program stored in the memory, wherein the first software program, when executed by the processor, performs an operation, the operation includes:
    at a first processing stage, associating a first memory area to an element of a plurality of data streams; upon detecting an arrival of a frame associated with one of the plurality of data streams, associating a second memory area to the arrived frame based on the element; recording in the second memory area, a data indicating an arrival of the arrived frame; on a successful recording, forwarding the frame to a second processing stage;
    a second software program stored in the memory, wherein the second software program, when executed by the processor at a preselected time interval, erases contents of the first memory area that correspond to the preselected time interval.

8. The network switch of claim 7, wherein the second memory area is a part of the first memory area.

9. The network switch of claim 7, wherein the first memory area is bigger than the second memory area.

10. The network switch of claim 7, wherein the independent process erases contents of the first memory area and the second memory area.

11. The network switch of claim 7, wherein the element of the plurality of data streams is a selected attribute that is common to the plurality of data streams.

12. The network switch of claim 7, wherein the preselected time interval is configurable by a user.

13. A method for monitoring a plurality of data streams, comprising:
    at a first processing stage, associating a memory area to an element of a plurality of data streams;
    upon arrival of a first frame associated with a first stream in the plurality of data streams, associating a first part of the memory area to the arrived first frame based on the element;
    recording in the first part, a first data indicating an arrival of the arrived first frame and on a successful recording, forwarding the first frame to a second processing stage;
    upon arrival of a second frame associated with a second stream in the plurality of data streams, associating a second part of the memory area to the arrived second frame based on the element;
    recording in the second part, a second data indicating an arrival of the arrived second frame and on a successful recording, forwarding the second frame to the second processing stage; and
    associating a first independent process with the first part and a second independent process with the second part, wherein the first independent process and the second independent process execute at preselected time intervals to erase contents of the first part and the second part that respectively correspond to the preselected time intervals.

14. The method of claim 13, further comprising:
    raising an exception if the recording of the first frame in the first part fails.

15. The method of claim 13, wherein the recording fails when all memory locations of the memory area are occupied.

16. The method of claim 13, wherein the element of the plurality of data streams is a selected attribute that is common to the plurality of data streams.

17. The method of claim 14, wherein the exception is handled by marking the first frame "out-of-policy".

* * * * *